(12) United States Patent
Tucker (10) Patent No.: US 11,470,920 B2
(45) Date of Patent: Oct. 18, 2022

(54) CONNECTION DEVICE FOR STRAPS

(71) Applicant: Tim Tucker, Auburn, NY (US)

(72) Inventor: Tim Tucker, Auburn, NY (US)

(*) Notice: Subject to any disclaimer, the term of this patent is extended or adjusted under 35 U.S.C. 154(b) by 0 days.

(21) Appl. No.: 17/148,890

(22) Filed: Jan. 14, 2021

(65) Prior Publication Data

US 2021/0212413 A1 Jul. 15, 2021

Related U.S. Application Data

(60) Provisional application No. 62/960,854, filed on Jan. 14, 2020.

(51) Int. Cl.
*A44B 11/12* (2006.01)

(52) U.S. Cl.
CPC ......... *A44B 11/125* (2013.01); *Y10T 24/4072* (2015.01)

(58) Field of Classification Search
CPC ............. Y10T 24/4077; Y10T 24/2175; Y10T 24/4072; A44B 11/12; A44B 11/125
See application file for complete search history.

(56) References Cited

U.S. PATENT DOCUMENTS

| 3,574,342 | A | * | 4/1971 | Berns | B65D 63/16 24/68 CD |
| 3,893,210 | A | * | 7/1975 | Hildebrandt | A44B 11/125 24/265 R |
| 4,564,981 | A | * | 1/1986 | Knox | A44B 11/125 410/23 |
| 4,918,790 | A | * | 4/1990 | Cirket | A44B 11/006 24/71 R |
| 7,004,695 | B1 | * | 2/2006 | Wen-Hsiang | B60P 7/0823 410/23 |
| 2018/0194269 | A1 | * | 7/2018 | Chen | B60P 7/06 |
| 2020/0163418 | A1 | * | 5/2020 | Morgan | A44B 11/10 |
| 2020/0214399 | A1 | * | 7/2020 | Morgan | B60R 22/30 |
| 2021/0137221 | A1 | * | 5/2021 | Mowad | G08B 21/18 |

* cited by examiner

*Primary Examiner* — Robert Sandy
*Assistant Examiner* — Michael S Lee
(74) *Attorney, Agent, or Firm* — Andrew Morabito (57) ABSTRACT

The present invention is a buckle comprising: a lever having a first set of apertures and a second set of openings; a rod, wherein the rod is inserted through the first set of apertures; a pin, wherein the pin is inserted through the second set of openings; a base plate rotatably attached to the pin and positioned within the lever; a set of locking tabs in communication with the rod a bar rotatably attached to the pin; and a strap attached to the bar at a first end and releasably engaged with the base plate and the pin.

13 Claims, 10 Drawing Sheets

CONNECTION DEVICE FOR STRAPS

BACKGROUND OF THE INVENTION

The present invention relates to a connection device, and more particularly to a connection device for suspension or tie-down straps.

Typical connector devices or buckle mechanisms for coupling or for suspending straps have been developed for coupling two straps together or securing the strap over a payload or trailer to keep the contents in place during transportation. They typically comprise a ring or loop for attaching or coupling to a lock device, and the straps are coupled to the loop and the lock device respectively, for allowing the straps to be coupled together by engaging the loop toward the lock device. These devices also allow for the ratcheting or tightening of the straps to secure the payload.

However, these devices are typically either difficult to use due to their complicated setups and design, or they are difficult to tighten the straps. If they do incorporate a locking mechanism, they are typically difficult to engage or disengage.

It would be desired for a connection device for the straps to have a simple and easy design, with a locking mechanism that is easy to engage, easy to visual that the lock is engaged, and easy to disengage.

SUMMARY

In a first embodiment, the present invention is a buckle comprising: a lever having a first set of apertures and a second set of openings; a rod, wherein the rod is inserted through the first set of apertures; a pin, wherein the pin is inserted through the second set of openings; a base plate rotatably attached to the pin and positioned within the lever; a set of locking tabs in communication with the rod a bar rotatably attached to the pin; and a strap attached to the bar at a first end and releasably engaged with the base plate and the pin.

In a second embodiment, the present invention is a buckle comprising: a lever having a first and second side and a first end and a second end, wherein a set of openings are positioned on each side and distal to a first end, a set of apertures are present on each side and distal to the set of openings, and a set of slots present in each side distal to the second end; a rod inserted through the set of openings; a pin inserted through the set of apertures; a base plate rotatably connected to the rod and positioned between the first and second side of the lever; a guide member rotatably connected to the pin and positioned between the first and second side of the lever; a bar rotatably connected to the pin; a set of locking tabs positioned on each side of the guide member and in contact with the pin; and a tension spring in contact with the set of locking tabs; wherein, the locking tabs are in a constant state of tension against the first and second side of the lever.

In a second embodiment, the present invention is a buckle comprising: a lever having a first and second side and a first end and a second end, wherein a set of openings are positioned on each side and distal to a first end, a set of apertures are present on each side and distal to the set of openings; a rod inserted through the set of openings; a bar rotatably connected to the rod; and a locking mechanism in communication with the rod, and wherein the locking mechanism has extensions which extend through the set of apertures.

DETAILED DESCRIPTION OF THE INVENTION

The present invention provides a device that allows for the ability to quickly and easily secure a strap around a payload with a safe and secure locking mechanism. The locking mechanism provides for a multi-point locking system that also has a visual indicator of the lock being full engaged. The lock is also easy to disengage based on the present design.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

FIGS. 1-6 depict illustrations of a tie-down strap buckle 100 in a "locked" position, in accordance with one embodiment of the present invention. The present invention provides an advantage of allowing a user to quickly unlock the tie-down with minimal work while also providing a high degree of securement of the goods which are secured by the device. Through the novel locking method, shaking, bumps, or movement of the tie-down will not affect the lock. The tie-down strap buckle 100 is comprised of a lever 200, bottom plate 300, direction plate 106, spring 107, locking tabs 103, bar 102, pin 104, rod 105.

The bar 102 provides for the securement of one end of a strap. The bar 102 is a length of material with a predetermined curve and a predetermined profile with an aperture on each end to receive pin 104. The length of the bar 102 is based on the use of the tie-down strap buckle. The profile of the bar 102 is based on the locking tabs 103 which are used, so that an extension 121 of the locking tabs 103 is able to engage with the bar 102 and keep the lever 200 in the locked position. In some embodiments, the strap is permanently attached to the bar 102. In some embodiments, the user secures the strap to the bar 102 based on the user's preferred strap. In the depicted embodiment, the bar 102 has a "U" shape design and extends a set distance from the lever to allow ample space for the attached of the strap. In some embodiments, the bar 102 is able to rotate freely about the pin 104.

Figure 3:
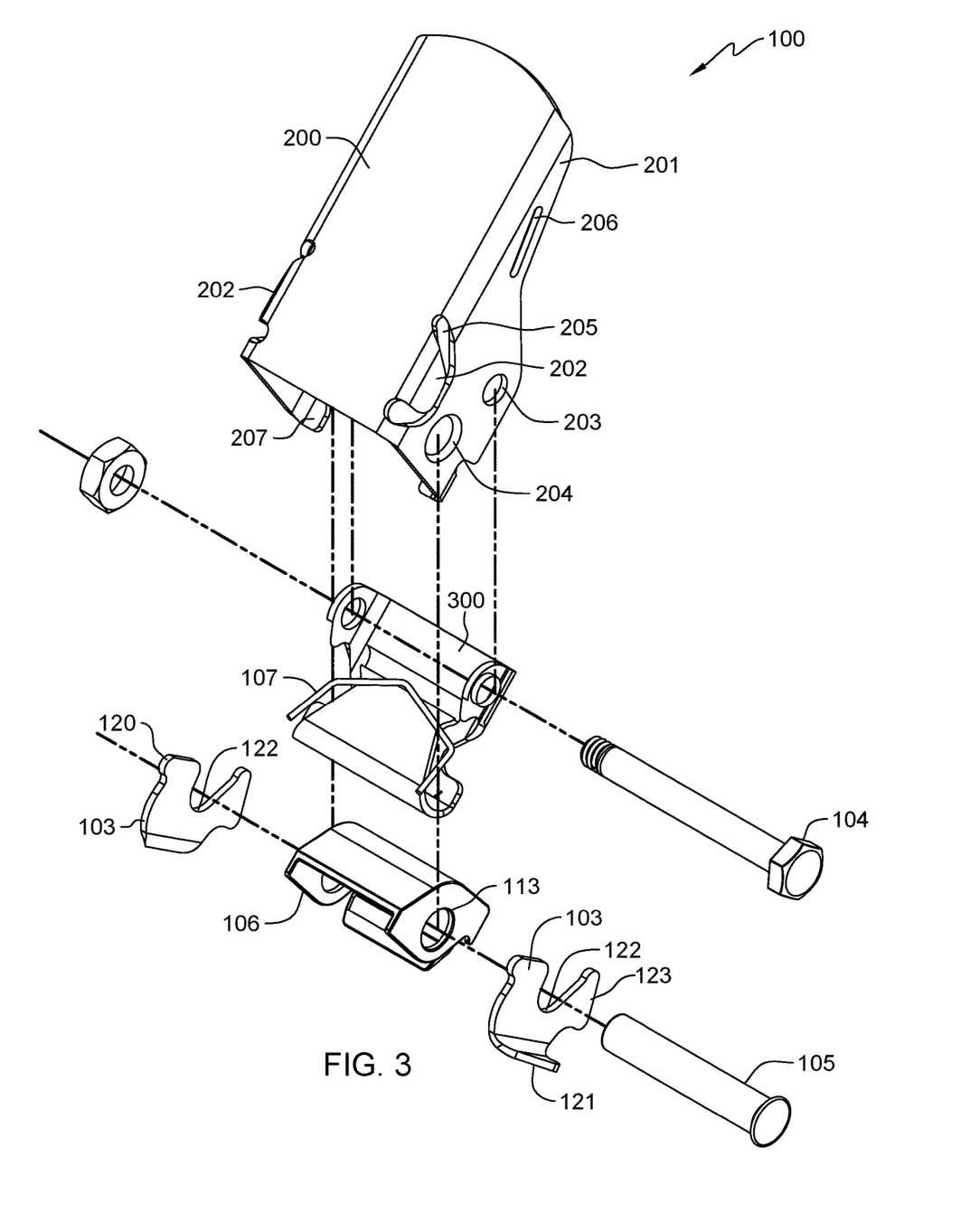
FIG. 3 depicts an illustration of the tie-down strap buckle in an exploded view, in accordance with one embodiment of the present invention.

The lever 200 provides the area which the user is able to interact with when locking and unlocking the tie-down strap buckle. The lever 200 (as shown in FIG. 3) has a set of apertures 204 and 203 on both sides of the lever to receipt the rod 105 and the pin 104 respectively and are sized accordingly. An aperture 205 is formed relative to the apertures 204 and 203 and has a predetermined shape to receive a protrusion 120 of locking tabs 103. Within this aperture 205 a winglet 202 is formed and improves the structural integrity and reduce torsional rotation of the lever 200. On the underside of the lever 200 is a set of tabs 207 which are used to secure the bottom plate 300 in position when the tie-down is operated. A slot 206 is positioned towards the end of the body 201 of the lever to allow the passage of a strap tie (shown in FIGS. 6 and 7). The size and positioning of apertures 203 204 and 205 are based on the size and positioning of the other internal components of the tie-down strap buckle 100, presented in this embodiment, is just one design.

The lever 200 provides for the portion of the buckle 100 that the user interacts with to lock and unlock the buckle 100. The lever 200 is designed for the user to press down on and pull up to lock and unlock the buckle 100 respectively. By design, the lever 200 has a predetermined length to provide a moment arm about the rod 105 to allow for ease of locking and unlocking the buckle 100. The lever 200 also provides a housing for the bottom plate 300 and locking tabs 103 to protect these components from the elements. The lever 200 is also, the containment casing to hold everything together in their proper place, and to give rigidity to the buckle 100.

Pin 104 extends through the aperture 203 of the lever 200 and also through the base plate 300. In the depicted embodiment the pin 104 is a bolt with a nut, this allows for the removal or replacement of the pin 104. In various embodiments, the pin 104 maybe permanently secured within the assembly. Rod 105 is inserted through openings 204 of the lever and openings 113 of the direction plate 106 and interacts with the groove 122 of the locking tabs 103.

Figure 4:
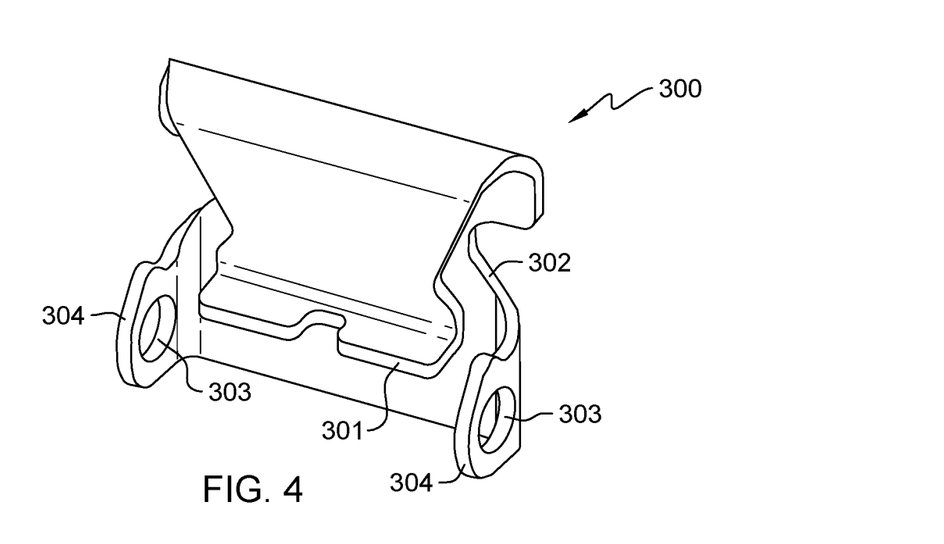
FIG. 4 depicts an illustration of a bottom plate of the tie-down strap buckle in use, in accordance with one embodiment of the present invention.
Figure 5:
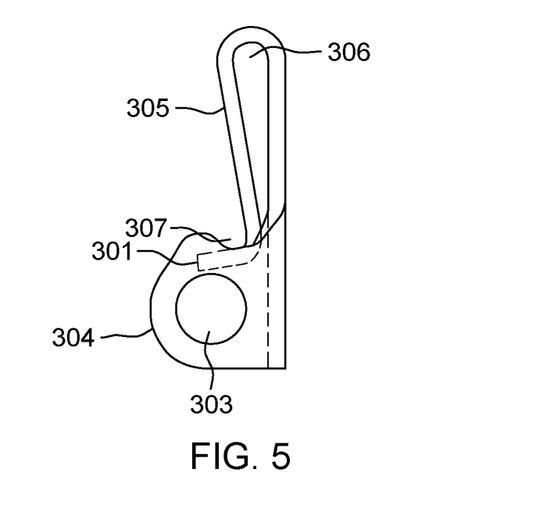
FIG. 5 depicts an illustration of a bottom plate of the tie-down strap buckle in use, in accordance with one embodiment of the present invention.

The bottom plate 300 is designed to assist with both directing the strap through the tie-down strap buckle and also securing the strap in place. As shown in FIGS. 4 and 5, the bottom plate 300 is a solid piece of material that has a set of side extensions 304 with apertures 303 to allow the passage of rod 105. A groove (or cutout) 302 is formed in each side of the bottom plate 300 along the main body. The main body is bent about point 306, and again about point 307 to form the upper portion 305 and the tab 301 respectively. The bottom plate 300 is folded back over itself about a point 306 to at a predetermined radius to form the upper portion 305 which extends back towards the apertures 303 and about point 307 the main body of the bottom plate 300 is folded or bent again to form extension 301. In one embodiment, the radius of the bend about point 306 is 0.14 inches and the radius of the bend about point 307 is 0.8 inches. The bottom plate 300 is designed to have a substantially rigid form when opening and closing the tie-down strap buckle 100 to assist in the securing of the strap in place. The design and profile of the bottom plate 300 is based on the size and use of the tie-down strap buckle 100. The bottom plate 300 assists in keeping the strap locked in place and in a constant state of tension when in the locked position, but once moved to an open position the bottom plate 300 permits the strap to easily slide to loosen or further tighten the strap. The bottom plate 300 assists in keeping the strap in a state of tension and locked in place when the tie-down strap buckle 100 is in the locked position. In the depicted embodiment, the bottom plate 300 has a series of cutouts and notches based on the locking tab 103 design and the lever 200 design. The extensions 304 are sized and designed to allow the rod 105 to fit through the apertures 103 and provide enough structural rigidity to handle the tension forces applied, while allowing the bottom plate 300 to rotate about the rod 105.

The guide 106 assists with redirecting the strap once it is passed around the rod 105. The guide has a set of openings to receive rod 105 and has a compartment which is formed around the rod 105. This assists the user in forcing the strap back outside of the lever to easily grab and send back to tighten the strap. Springs 107 assist in keeping the locking tabs 103 pressed against the inside surface of the lever 200.

Figure 11:
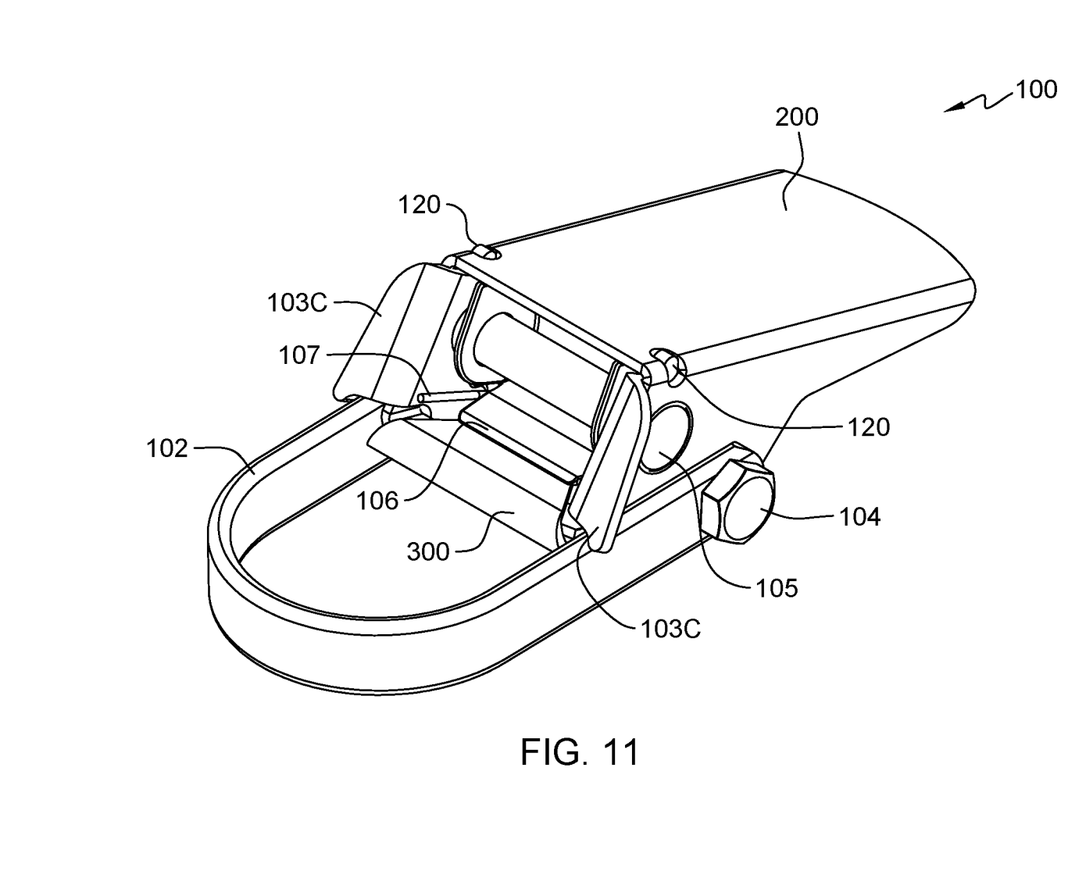
FIG. 11 depicts an illustration of a tie-down strap buckle in a "locked" position, in accordance with another embodiment of the present invention.

The locking tabs 103 allow the lever to be locked in a set position when in use and are easily engaged by the user. The locking tab 103 is formed from a single piece of material and has a single bend, where an engagement tab 121 is formed. This engagement tab may have various designs and profiles based on the intended design of the overall buckle 100. As shown in FIG. 11, the locking tab 103C has a varied design with a larger engagement tab 121. Opposing the engagement tab 121 is the body of the locking tab 103 which has protrusion 120, groove 122, and extension 123. The groove 122 interfaces with rod 105 to allow the locking tab 103 to rotate about the rod but remain in place. Protrusion 120 is designed to engage with the apertures 205 of the lever when in the "locked" position as shown in the figures. Extension 123 is designed to assist in the positioning of the locking tabs 103. The engagement tab 121 may have various shapes, contours, designs, and embodiments based on the design of the buckle. Overall, the engagement tab 121 of the locking tabs 103 are designed to adequately engage with the bar 102 and also provide enough surface area for a user to apply pressure with their fingers/hands to lock/unlock the buckle 100.

Figure 1:
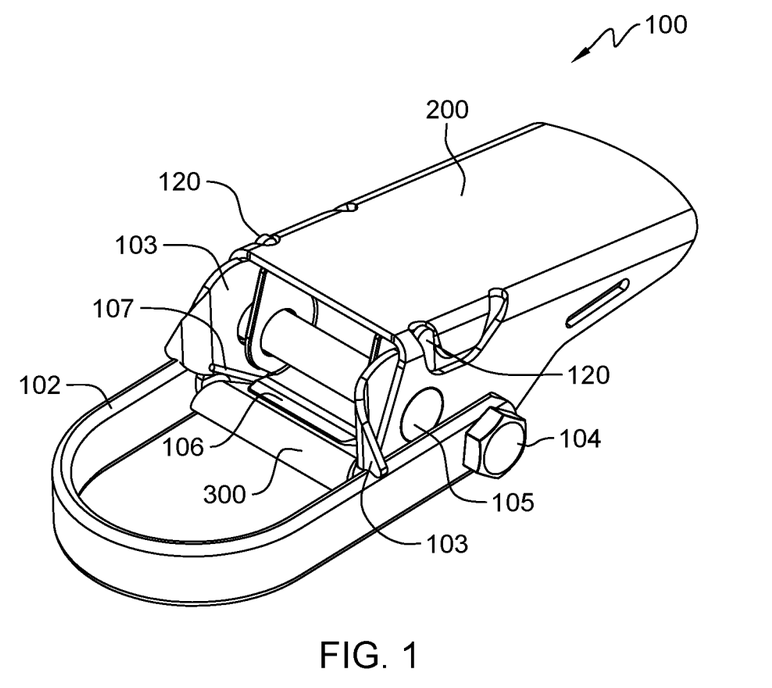
FIG. 1 depicts an illustration of a tie-down strap buckle in a "locked" position, in accordance with one embodiment of the present invention.

In FIG. 1, the locking tabs 103 are shown extending over the bar 102 and are secured in place, locking the lever 200. The extensions 121 of the locking tabs 103 have a predetermined contour to allow the locking tabs 103 to engage and remain engaged with the bar 102 but allow enough of a contact surface for a user to press on the locking tabs 103 to unlock the lever 200. In the depicted embodiment, the extension 121 of the locking tabs 103 is curved outwards from the center of the buckle 100 and has a lip on the lower edge to assist in keeping the locking tabs 103 engaged with the bar 102.

The locking tabs 103 are pressure sensitive and would require a user to simultaneously press inwards (towards the center of the lever 200) on both locking tabs 103 to disengage the lock. The locking tabs 103 operate independent of each other. This provides an additional security feature where the lock is unlikely to become disengaged if hit or bumped. In the depicted embodiment, a protrusion 120 of the locking tabs 103 extends upwards into the aperture 205 created by the creation of the winglets 202 to secure the locking tabs 103 in the locked position. This provides an additional security feature where the lock is unlikely to become disengaged if hit or bumped. In the depicted embodiment, a section of the locking plate extends upwards into an aperture created by the winglets 202 to secure the locking tabs 103 in a set position about the rod 105.

Figure 2:
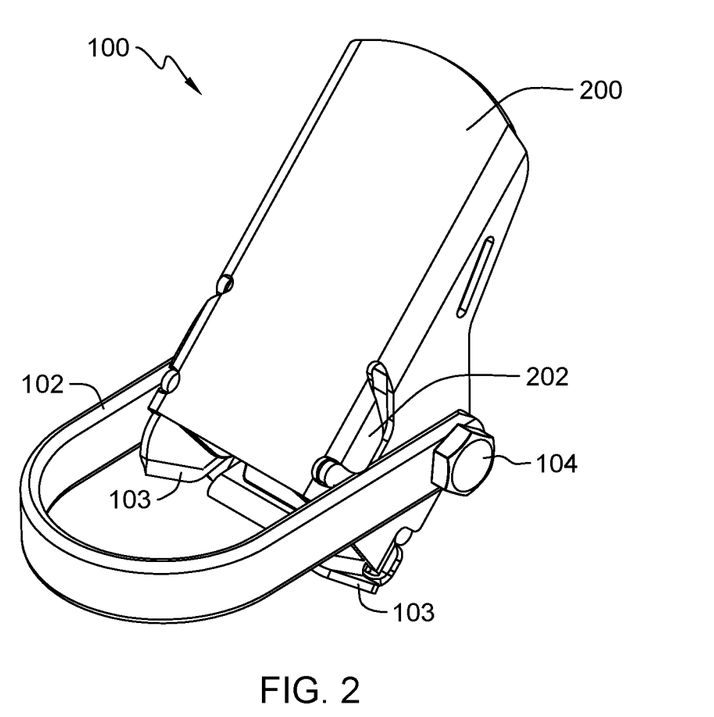
FIG. 2 depicts an illustration of the tie-down strap buckle in an "open" position, in accordance with one embodiment of the present invention.

FIG. 2 depicts the tie-down strap buckle 100 in an open position. In the "unlocked" position, in accordance with one embodiment of the present design. As shown the winglet 202 protrude a predetermined direction and distance from the lever 200 body to interact with the bar 102. When the lever 200 is placed in the unlocked position, the winglets 202 come in contact with the bar 102, thereby stopping the lever 200 from rotating beyond a position. This provides for an ideal position for the user to insert the strap. It also provides the ideal angle to initiate the full tightening of the strap. The lever 200 is designed with a predetermined length to provide proper leverage from the rod 105 to secure the payload. As shown in the depicted embodiment, the locking tabs 103 are underneath the bar 102, and based on the curved upper edge of the locking tabs 103, when the lever 200 is moved into the locked position, the locking tabs 103 do not provide any resistance or interfere with the repositioning of the lever 200.

Figure 6:
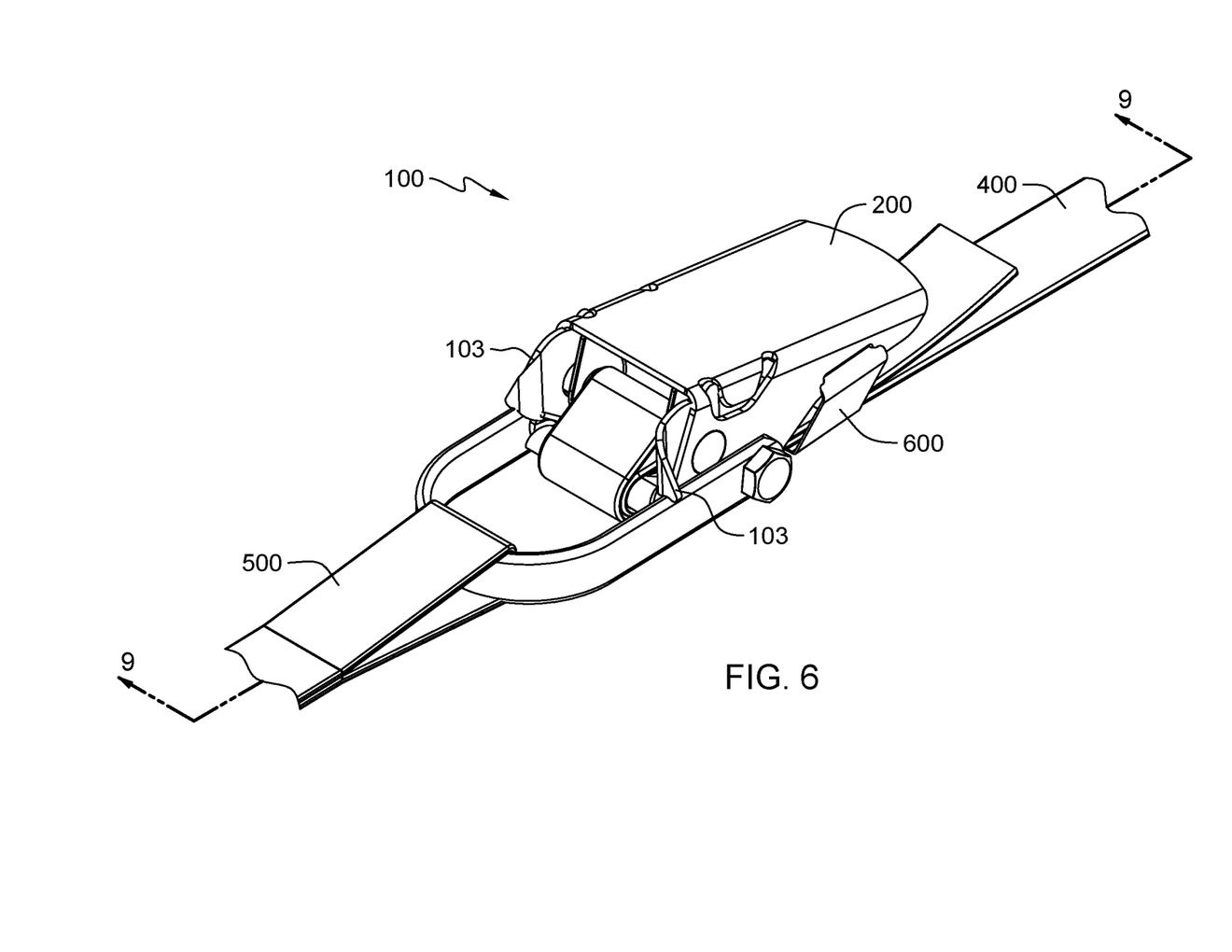
FIG. 6 depicts an illustration of the tie-down strap buckle in a "locked" position with straps, in accordance with one embodiment of the present invention.
Figure 7:
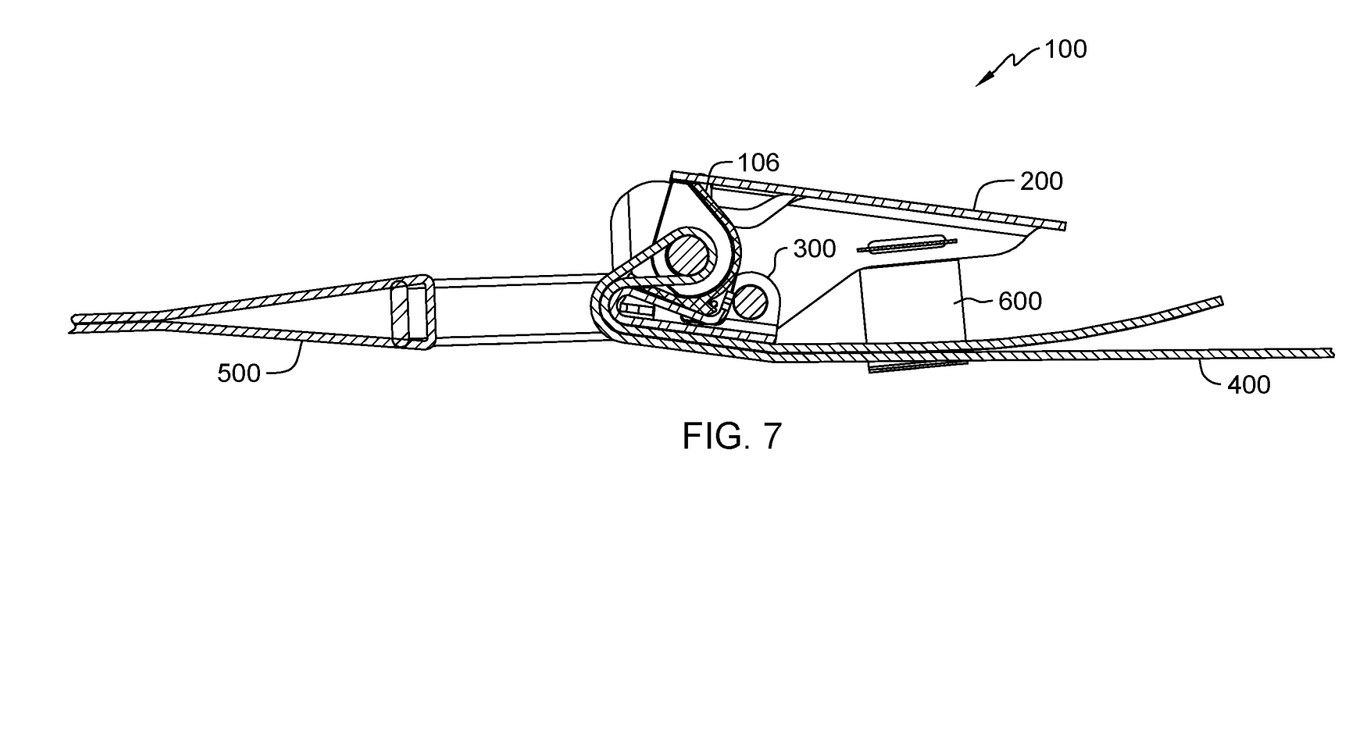
FIG. 7 depicts an illustration of a cross section view of the tie-down strap buckle in use, in accordance with one embodiment of the present invention.

FIGS. 6 and 7 show the tie-down strap buckle 100 in a "locked" position in both an isometric view and a section view, in accordance with one embodiment of the present invention. The tie-down strap buckle 100 is shown having two straps 500 and 400. In some embodiments, these are a single strap. In the depicted embodiment, a securement strap 600 is inserted through the series of slots 206 in the lever 200. The securement strap (e.g., Velcro® or hook and loop style fastener) is then used to secure the lever 200 in the locked position by securing around the strap 400. This provides for an additional security measure to make sure the lever 200 remains in the locked position is bumped or hit.

In the section view, the internal components are shown interacting with the strap 400 as it passes underneath the bottom plate 300, around rod 105 and back underneath the bottom plate. The guide 106 assists in redirecting the strap 400 once run around the rod 105.

Figure 8:
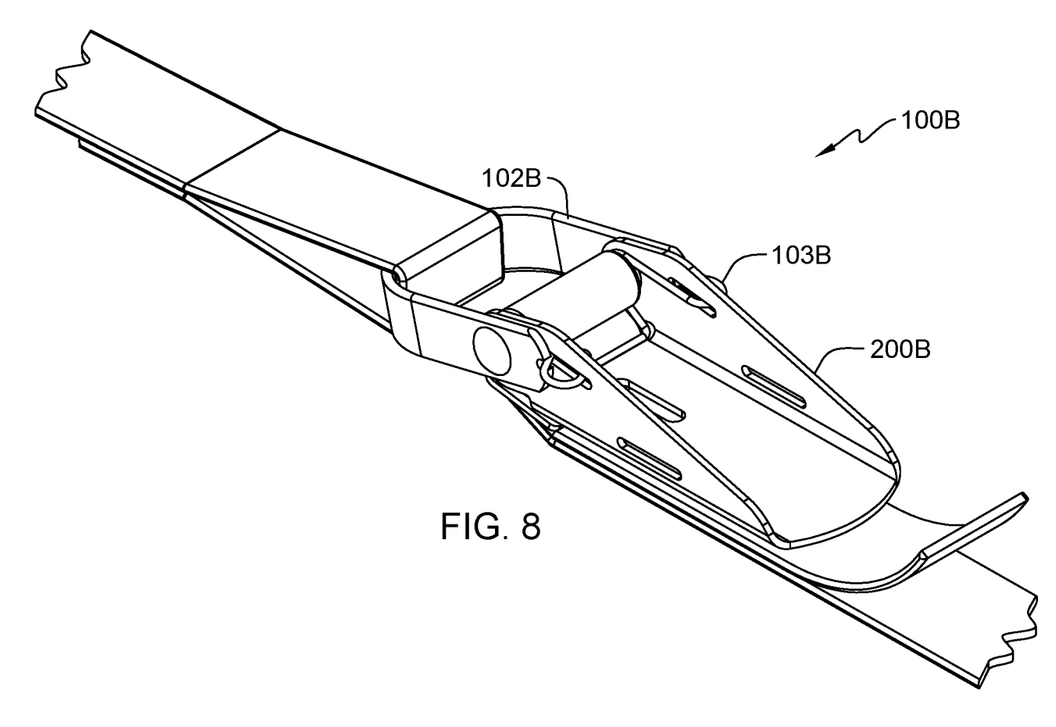
FIG. 8 depicts an illustration of the tie-down strap buckle in an "closed" position, in accordance with one embodiment of the present invention.
Figure 9:
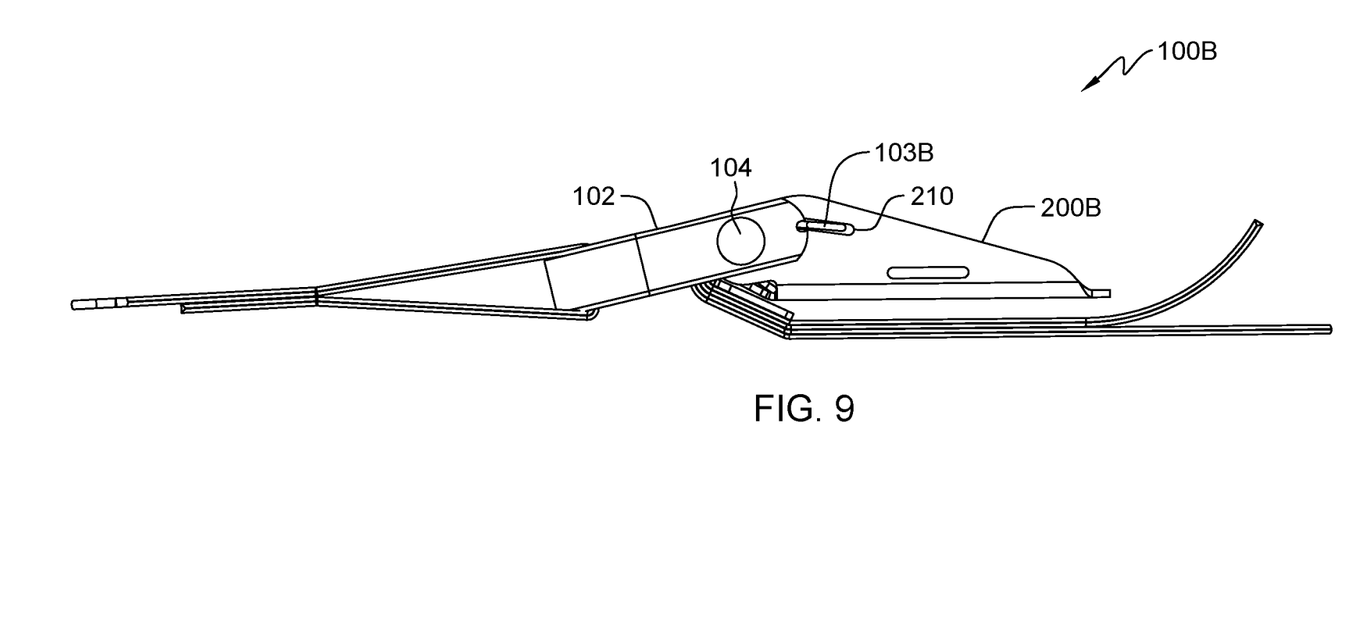
FIG. 9 depicts an illustration of the tie-down strap buckle in an "closed" position, in accordance with one embodiment of the present invention.
Figure 10:
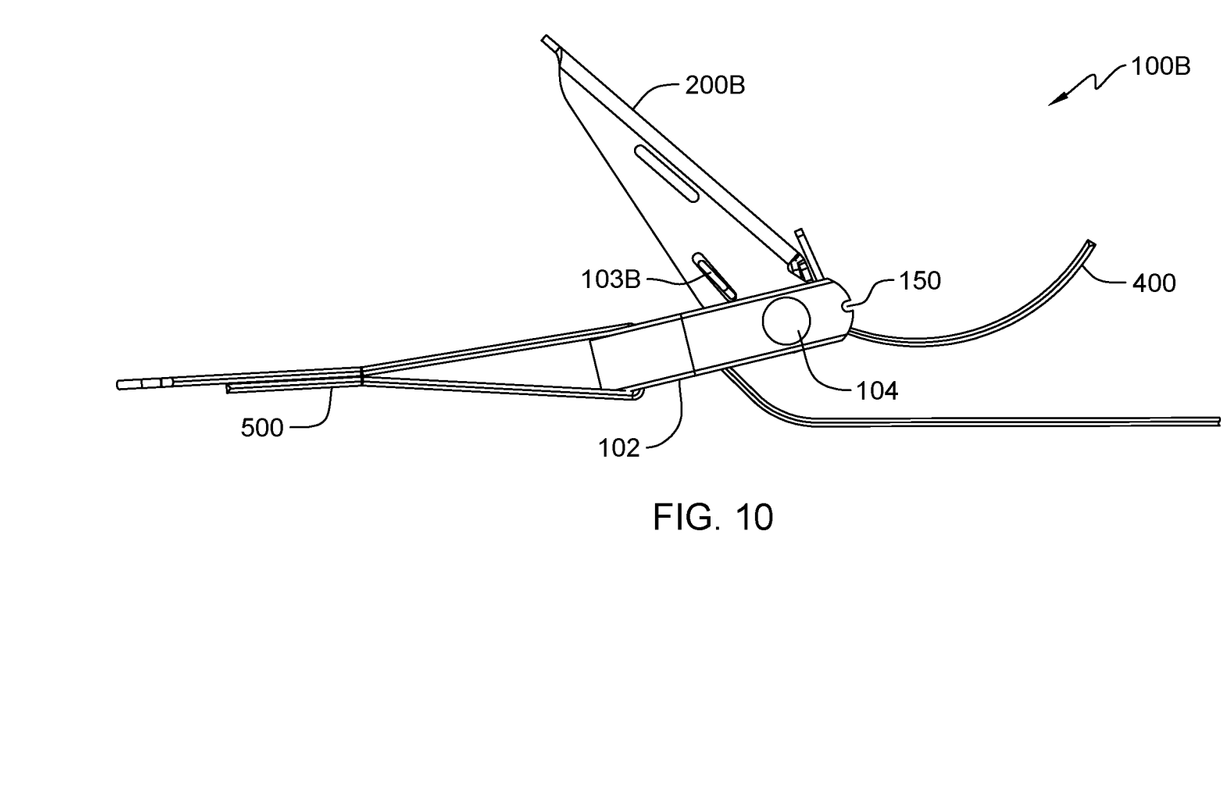
FIG. 10 depicts an illustration of a tie-down strap buckle in a "open" position, in accordance with one embodiment of the present invention.

FIGS. 8-10 depicted an embodiment of the tie-down strap 100B in various positions. In the present embodiment, the locking tabs 103 are replaced with a spring 103B which performs the same operation as the locking tabs 103. With the modified design of the locking mechanism, the bar 103B has a set of slots 150 to receive the spring 103B when in the locked position and the lever 200B has slots 210 also to receive the spring 103B. To close, the user will press the lever 200B down towards the strap and engaged the spring 103B. To disengage, the user would press on both ends of the spring 103B, and in doing so the lever 200B is able to rotate about pin 104. The spring 103B is designed so that when returning the lever 200B to the locking position, the user does not need to press on the spring 103B, but rather based on the tension of the spring and the alignment of the slot 150 and the apertures 210, the spring 103B will independently allow the lever 200 to return to the locking position by sliding along the bar until reaching the locked position.

The operation of the buckle 100 incorporates both the lever 200 and the bottom plate 300, where the strap is inserted between the bottom plate 300 and the lever 200 when the lever 200 is in the "unlocked" position, and the strap passes around the pin 104. Once the desired tension is reached, the operator rotates the lever 200 forcing the lever 200 and the bottom plate to tighten the strap further, and once the locking plates reached the final position, the strap is then locked.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A buckle comprising:
   a lever having a first set of apertures and a second set of openings, and a third set of apertures positioned distal to a first end, wherein a winglet is formed within each of the apertures;
   a rod, wherein the rod is inserted through the first set of apertures;
   a pin, wherein the pin is inserted through the second set of openings;
   a base plate rotatably attached to the pin and positioned within the lever;
   a set of locking tabs in communication with the rod
   a bar rotatably attached to the pin; and a strap attached to the bar at a first end and releasably engaged with the base plate.

2. The buckle of claim 1, wherein the locking tabs further comprise a protrusion, wherein the protrusion is sized to fit within the aperture.

3. The buckle of claim 1, wherein the winglets extend a predetermined distance from a side surface of the lever, wherein when rotated about the pin, the winglets come in contact with the bar.

4. The buckle of claim 1, further comprising a spring, wherein the spring is in contact with the set of locking tabs and the base plate.

5. The buckle of claim 1, wherein the set of locking tabs have an extension, wherein the extension has a predetermined length and interacts with the bar.

6. The buckle of claim 1 further comprising, a guiding member in communication with the pin and positioned between the locking tabs and in communication with the base plate.

7. The buckle of claim 1, wherein the lever further comprising a set of slots distal to a second end.

8. The buckle of claim 7, further comprising, a locking mechanism inserted through the set of slots.

9. The buckle of claim 1, wherein the base plate consists of a single piece of material with two symmetrical tabs formed with apertures to receive the pin and a main body which is bent about two points.

10. A buckle comprising:
a lever having a first and second side and a first end and a second end, wherein a set of openings are positioned on each side and distal to a first end, a set of apertures are present on each side and adjacent to the set of openings, and a set of slots present in each side distal to the first end, wherein the slots form a winglet;
a rod inserted through the set of apertures;
a pin inserted through the set of openings;
a base plate rotatably connected to the pin and positioned between the first and second side of the lever;
a guide member rotatably connected to the rod and positioned between the first and second side of the lever;
a bar rotatably connected to the pin;
a set of locking tabs having a groove and the rod is positioned within the groove and the locking tabs are positioned on each side of the guide member; and
a tension spring in contact with the set of locking tabs;
wherein, the locking tabs are in a constant state of tension against the first and second side of the lever.

11. The buckle of claim 10, wherein the set of locking tabs further comprise an extension which extend a predetermined distance to come in contacts with the bar.

12. The buckle of claim 10 further comprising a strap sized to fit through the set of slots.

13. The buckle of claim 10, wherein the set of locking tabs have at least one protrusion extending from a first end, wherein the protrusion is sized and positioned to engage with the aperture formed from the winglet.

* * * * *